United States Patent
Fraley (10) Patent No.: US 8,789,878 B2
(45) Date of Patent: Jul. 29, 2014

(54) SUNSHADE WITH AUTOMATIC CLOSING

(71) Applicant: Toyota Motor Engineering & Manufacturing North America, Inc., Erlanger, KY (US)

(72) Inventor: Josh D. Fraley, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/647,520

(22) Filed: Oct. 9, 2012

(65) Prior Publication Data

US 2014/0097645 A1 Apr. 10, 2014

(51) Int. Cl.
*B60J 3/04* (2006.01)
*B60J 7/057* (2006.01)

(52) U.S. Cl.
USPC .......................................... 296/214; 296/223

(58) Field of Classification Search
USPC ................................................ 296/214, 223
See application file for complete search history.

(56) References Cited

U.S. PATENT DOCUMENTS

| | | | | |
|---|---|---|---|---|
| 4,671,564 A | * | 6/1987 | Sumida et al. | 296/214 |
| 4,844,534 A | * | 7/1989 | Boots | 296/214 |
| 4,981,290 A | * | 1/1991 | Huyer | 296/214 |
| 5,250,882 A | | 10/1993 | Odoi et al. | |
| 5,810,429 A | * | 9/1998 | Jardin et al. | 296/214 |
| 6,056,352 A | * | 5/2000 | Ewing et al. | 296/214 |
| 6,592,178 B2 | | 7/2003 | Schober et al. | |
| 7,281,758 B2 | | 10/2007 | Fuchs et al. | |
| 7,296,851 B2 | | 11/2007 | Kronseder et al. | |
| 8,303,031 B2 | * | 11/2012 | Horiuchi et al. | 296/214 |
| 8,439,433 B2 | * | 5/2013 | Kim et al. | 296/214 |

FOREIGN PATENT DOCUMENTS

DE 10212006 3/2002

* cited by examiner

*Primary Examiner* — Dennis H Pedder
(74) *Attorney, Agent, or Firm* — Dinsmore & Shohl LLP (57) ABSTRACT

A moonroof assembly including a transparent panel and a sunshade that are moveable between closed positions and fully open positions. A mechanism is coupled between the panel and the sunshade so as to effectuate automatic movement of the sunshade into the partially open position in response to movement of the panel into its fully open position.

17 Claims, 6 Drawing Sheets

SUNSHADE WITH AUTOMATIC CLOSING

BACKGROUND

1. Field of the Invention

The present invention generally relates to moonroofs found in automotive vehicles. More specifically, the invention relates to the manipulation of a sunshade associated with a moonroof.

2. Description of Related Technology

Moonroofs and sunroofs, hereafter just moonroofs, have long been a popular option in automotive vehicles. Generally, a moonroof includes a panel, formed of glass or an opaque material, that is movable between a closed position and an open position. In the closed position, the panel closes off an opening in the roof of the vehicle. In its open position, the panel has been moved to a location beneath or above the roof of the vehicle and has been slid rearward by an amount such that the opening in the roof of the vehicle is substantially unobstructed by the panel.

In addition to the panel, a moonroof often has associated with it a sunshade. The sunshade is an opaque trim panel that is movable between a position where it either blocks sunlight from entering through the moonroof into the occupant compartment of the vehicle or permits the same. As such, the sunshade is similarly slideable from a position fully obstructing the moonroof (the fully closed position of the sunshade) to a position where the sunshade is retracted as far as possible out of the opening of the moonroof (the fully open position of the sunshade). For various reasons, an occupant of the vehicle may move the sunshade to a partially opened/closed position, a position somewhere between the fully closed position and the fully opened position. Such a position may be chosen when it is desirable that sunlight entering through the moonroof opening be at least partially blocked. This may be due to the position of the sun or the relative position and direction of travel of the vehicle.

The opening and closing of the moonroof is typically performed through the activation of a switch located within the passenger compartment of the vehicle. By depressing the switch, it is often possible to initiate opening of the moonroof by raising a rearward edge of the moonroof. This position of the moonroof is often referred to as the vent position. By further depressing and/or holding the switch, it is possible to slide the moonroof rearward such that the leading or forward edge of the panel is retracted relative to the roof opening as far as mechanically possible or to some location therebetween. To cause this movement of the panel, the panel is mounted to a guiderail by an arm that is capable of sliding and lifting. The arm or a portion attached thereto is coupled to a flexible cable which is in turn connected to an actuator, such as an electric motor. The motor advances or retracts the cable and, as a result, causes the arm to advance or retract, thereby moving the panel between the fully closed position, the vent position and the fully open position, as well as all positions therebetween. The actuation motor can be positioned either forward or rearward of the roof opening, depending on the particular design constraints of the vehicle itself.

With regard to moving of the sunshade, the sunshade is moved between its various positions either manually, by engagement with the panel or by connection to a second actuator that specifically manipulates the sunshade.

SUMMARY

With the present invention, a moonroof assembly is provided in which at least partial manipulation of the sunshade is achieved without requiring a separate and actuation system. More specifically, the present invention achieves movement of the sunshade from a fully or substantially open position to a less or partially open position. With the present invention, this is achieved as a result of movement of the panel to its fully open position. In automatically moving the sunshade to this partially open position, the sunshade is brought into a position wherein the forward or leading end of the sunshade is beneath and/or generally adjacent to the forward end of the panel. Depending on the particular geometry and configuration of the vehicle within which it is employed, this positioning of the sunshade can be used to mitigate wind throb in the vehicle or aesthetically enhance the moonroof assembly. Wind throb is a condition where pulsating pressure is heard and/or felt by an occupant of the vehicle. While wind throb can occur over a range of speeds, there is often a pronounced peak in this condition at and around a given speed.

Accordingly, in one aspect of the invention a moonroof assembly for an automotive vehicle is provided that includes a transparent panel, an actuator and a sunshade. The panel is movable between a closed position, where an opening in the roof of the vehicle is closed off by the panel, and an open position, where the roof opening is not substantially unobstructed by the panel. The actuator is coupled to the panel and operative to move the panel between the closed position and the fully open position. The sunshade itself is movable between a closed position, a fully open position and a partially open position, the partially open position being a position between the closed position and the fully open position. In addition to the above, the moonroof assembly includes means for automatically moving the sunshade into the partially open position during and in response to opening of the panel.

In another aspect of the invention, the mechanism for automatically moving the sunshade into the partially open position manipulates the sunshade in response to the panel being moved into its fully open position.

In a further aspect of the invention, the mechanism for automatically moving the sunshade into the less open position moves the sunshade from the fully open position of the sunshade.

In an additional aspect of the invention, the mechanism for automatically moving the sunshade into the less open position includes a movable stopper. The stopper is movable into engagement with the sunshade such that movement of the sunshade is caused by movement of the stopper.

In another aspect of the invention, the stopper is mechanically coupled to a movable driver. The driver is configured to be engaged and moved by a portion of the panel as the panel is being moved into its open position. Thus, movement of the driver causes movement of the stopper, which in turn causes movement of the sunshade in a direction towards a partially open position thereof.

In a further aspect of the invention, the stopper is mechanically coupled to the driver by an actuation member, such as a flexible cable.

In yet another aspect of the invention, the stopper and the driver move in a common direction. In a still further aspect of the invention, the stopper and the driver move in opposite directions.

In an additional aspect of the invention, the driver is movable in a sliding or pivoting movement.

In yet a further aspect of the invention, the mechanism that engages and moves the drive member is part of the mechanism that moves the panel.

In another aspect of the invention, a method is provided for partially closing a sunshade of a moonroof assembly wherein the method includes the steps of providing a panel that is movable between a closed position where an opening in the vehicle's roof is closed and an open position where the opening in the vehicle's roof is not obstructed by the panel and providing a sunshade that is movable between a closed position, a fully open position and a partially open position, the latter position being located between the closed position and the fully open position. The method further includes the step of moving the panel into the fully open position and, in response to the moving of the panel into the fully open position, automatically moving the sunshade into the partially open position of the sunshade.

In yet another aspect of the invention, the partially open position is one where a wind buffeting effect is achieved and wind throb in the vehicle is at least partially mitigated.

In a further aspect of the invention, the sunshade is moved into the partially open position from the fully open position.

In yet another aspect of the invention, the sunshade is moved into the partially open position from a position that is not the fully open position.

Further, objects, features and advantages of this invention will become readily apparent to persons skilled in the art after a review of the following description, with reference to the drawings and the claims that are appended to and form a part of this specification.

DETAILED DESCRIPTION

Figure 1:
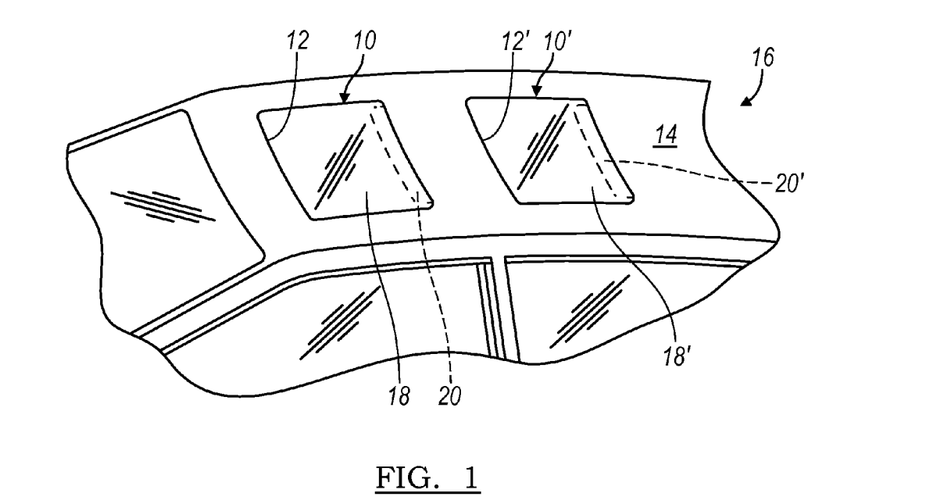
FIG. 1 is a partial perspective view of an automotive vehicle having dual moonroof assemblies, with both moonroof assemblies being shown in their closed positions.
Figure 2:
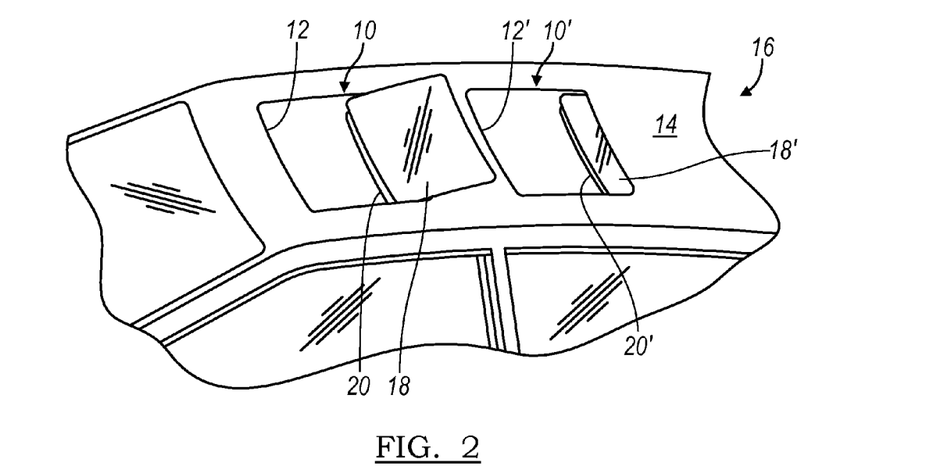
FIG. 2 is a partial perspective view of the automotive vehicle of FIG. 1 with both of the moonroof assemblies in fully open positions.

Referring now to the drawings, illustrated in FIGS. 1 and 2 is a moonroof assembly 10 embodying the principles of the present invention. The moonroof assembly 10 is designed to be movable between a closed position, as seen in FIG. 1, and an opened position, which is seen in FIG. 2.

In the closed position, an opening 12 in the roof 14 of a vehicle 16 is closed off by a transparent panel 18 of the moonroof assembly 10. In the opened position, the transparent panel (hereafter just "panel") 18 has been moved generally out of the roof opening 12. In a fully opened position, the panel 18 is located at the rearward most extent of its movement, which is generally represented in FIG. 2.

Also seen in FIGS. 1 and 2 is a second moonroof assembly 10'. The second moonroof assembly 10' similarly includes a transparent panel (hereafter just "panel") 18' that is movable between a closed position (seen in FIG. 1) and a fully open position (seen in FIG. 2) relative to an opening 12' in the roof 14 of the vehicle 16. The difference between the second moonroof assembly 10' and the first moonroof assembly 10 relates to the orientation of the panels 18 and 18' in their open positions. When in its fully open position, the panel 18' of the second moonroof assembly 10' is moved to a position beneath the roof 14 of the vehicle 16. The panel 18 of the first moonroof assembly 10, however, is moved to a position located exteriorly of the roof 14 of the vehicle 16 in its fully open position. The teachings of the present invention, however, are applicable to either type of construction.

Modern automotive vehicles often have one or more large openings in their structures; such openings may take the form of a window or a moonroof. As a result of these openings and other vehicle characteristics, wind throb can occur when the vehicle is traveling. The wind throb condition occurs when an automotive vehicle is traveling with its windows and/or moonroof open at a speed that produces a pressure pulsation. This pressure pulsation can be felt and/or heard by the passengers in the vehicle. It has been unexpectedly found that in a vehicle having a moonroof assembly, the wind throb condition may be mitigated and/or eliminated by properly positioning the sunshade of the moonroof assembly relative to the roof opening and/or the panel.

While a vehicle having dual moonroof assemblies 10, 10' is illustrated in FIGS. 1 and 2, the discussion that follows will generally only make reference to one moonroof assembly. It will be understood by those skilled in the art that the principles of the present invention are equally applicable to vehicles having a single moonroof assembly and to either of the alternative styles of moonroof assemblies seen herein when employed in a single moonroof application.

As used in this description, directional references, such as forward and rearward, are references relative to the automotive vehicle 16. The forward direction is therefore intended to mean toward the front of the vehicle, the rearward direction toward the rear of the vehicle, etc.

Moonroof assemblies also typically include sunshades that may be used to block the sun from shining into the passenger compartment of the vehicle when the panel 18 is located in its closed position. As generally represented in FIG. 1, sunshades 20, 20' are shown in what is herein referred to as the fully open position. In the fully open position, the sunshades 20, 20' are retracted into their rearward most position. This fully open position provides for the maximum amount of viewing area/space through the openings 12, 12' and respective panels 18, 18' of the moonroof assemblies 10, 10'. In FIG. 2, as will be discussed below, the sunshades 20, 20' have been moved forward from their fully open positions (the fully open positions being seen in FIG. 1). In FIG. 2, the sunshades 20, 20' are located in a position that is less open than the fully open position. In other words, the sunshades 20, 20' are partially closed. In this partially closed position, the leading or forward edge of the sunshades 20, 20' are located forward of their positions in the fully open position and may be located adjacent to and generally below the leading or forward edge of their respective panels 18, 18'. The sunshades 20, 20', in this position, aesthetically conceal other portions of the moonroof assembly 10, 10' and may also effectively mitigate wind throb.

For the sake of clarity, hereafter, only the first moonroof assembly 10 is illustrated and discussed. It will be understood, however, that the various features discussed in connection with the first moonroof assembly 10 will be equally applicable to the second moonroof assembly 10', unless clearly indicated otherwise.

Figure 3:
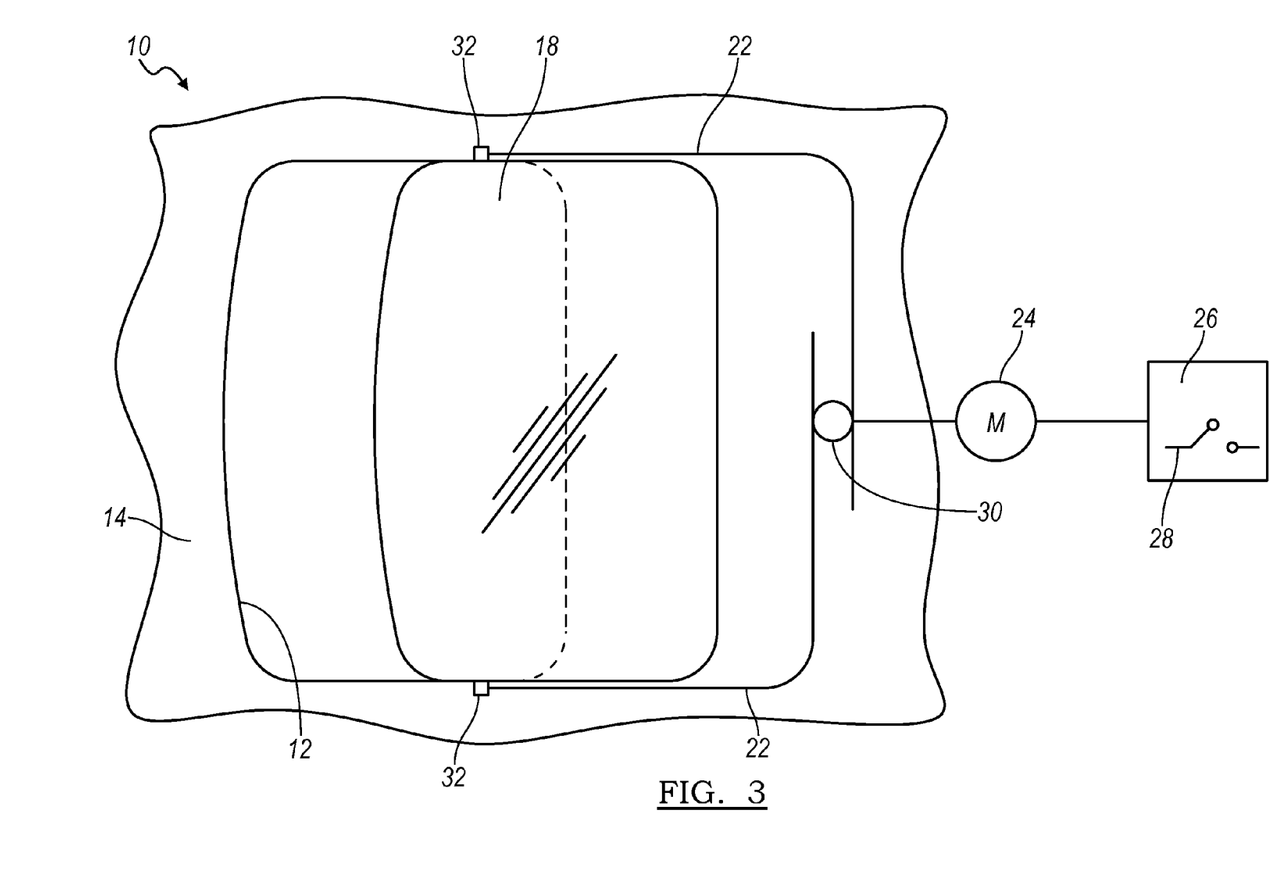
FIG. 3 is a schematic illustration of a mechanism for opening a panel of a moonroof assembly.

Referring now to FIG. 3, the means for actuating the panel 18 of the moonroof assembly 10 is schematically illustrated therein. The panel 18 is coupled by way of a pair of flexible cables 22 or other linkage to a motor 24. The motor 24 is in turn connected to a control circuit 26. The control circuit 26 includes a switch 28 accessible by an occupant within the passenger compartment of the vehicle 16. By operating the switch 28, the occupant of the vehicle 16 may cause the panel 18 to be moved from its closed position to its fully open position or to a position somewhere therebetween. To achieve this movement, the motor 24, which may be a DC motor, drives a gear 30 that is in turn coupled to the flexible cables 22. When the gear 30 is rotated by the motor 24 in a first direction (a clockwise direction in FIG. 3) the panel 18 is moved in a rearward direction, toward its fully open position. When the gear 30 is rotated by the motor 24 in a second direction (a counterclockwise direction in FIG. 3) the panel 18 is moved in a forward direction, towards its closed position. The flexible cables 22 are preferably coupled to the sides of the panel 18. While the cables 22 may be directly coupled to the panel 18, in a more preferred arrangement, the cables 22 are coupled to transport arms 32 that carry the panel 18 in a support rail 34. The transport arms 32 are schematically shown as blocks in FIG. 3, but are illustrated in greater detail in FIGS. 4-6.

Figure 4:
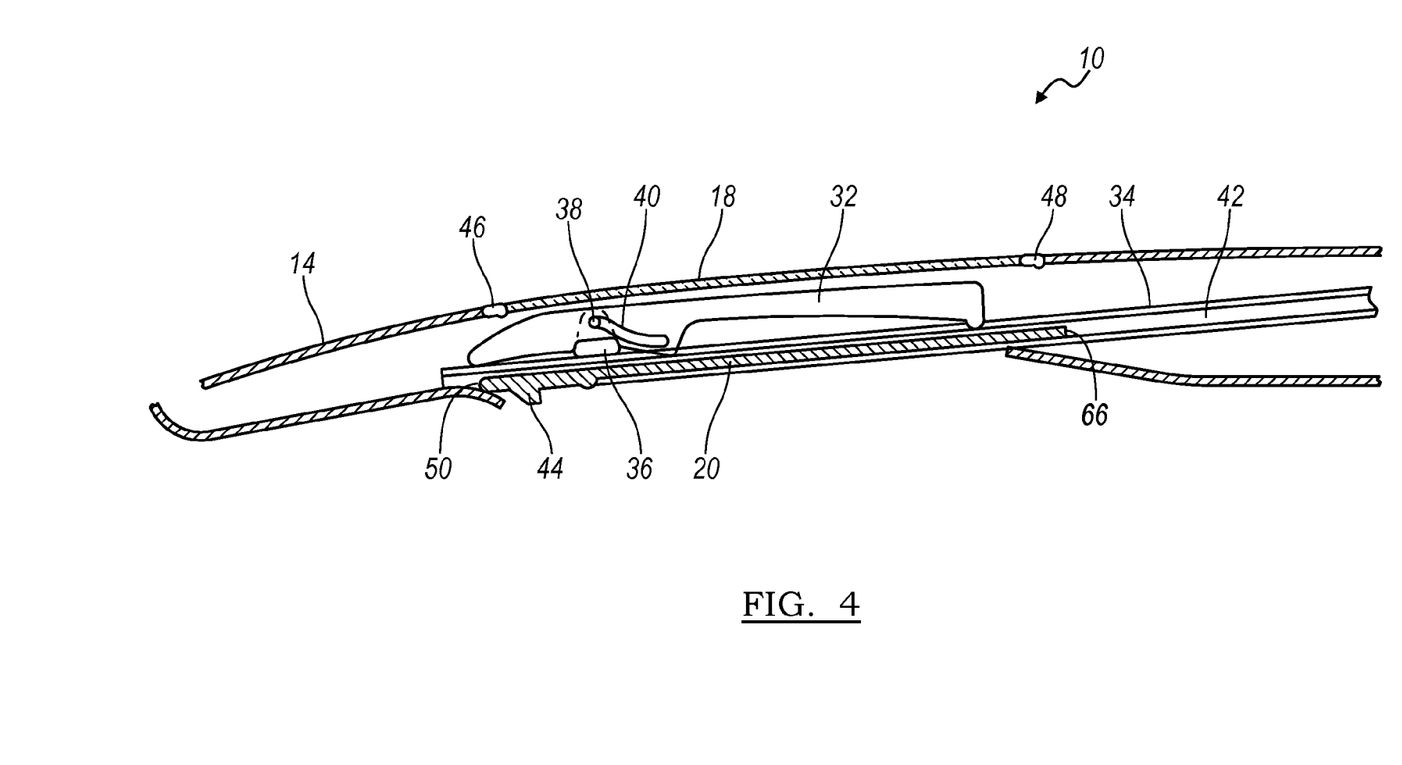
FIG. 4 is a partial sectional view of a moonroof assembly with its panel in a closed position and with its sunshade also in a closed position.
Figure 5:
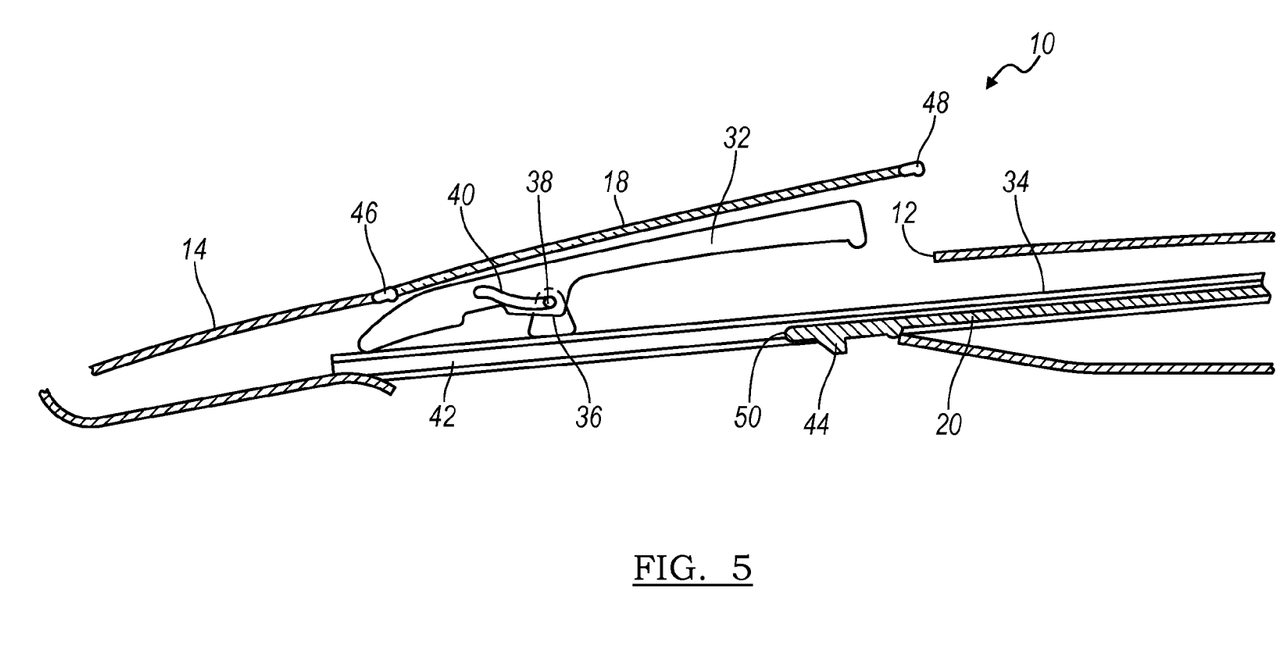
FIG. 5 is a partial sectional view of the moonroof assembly of FIG. 4 with the panel in a vent position and with the sunshade in a fully open position.
Figure 6:
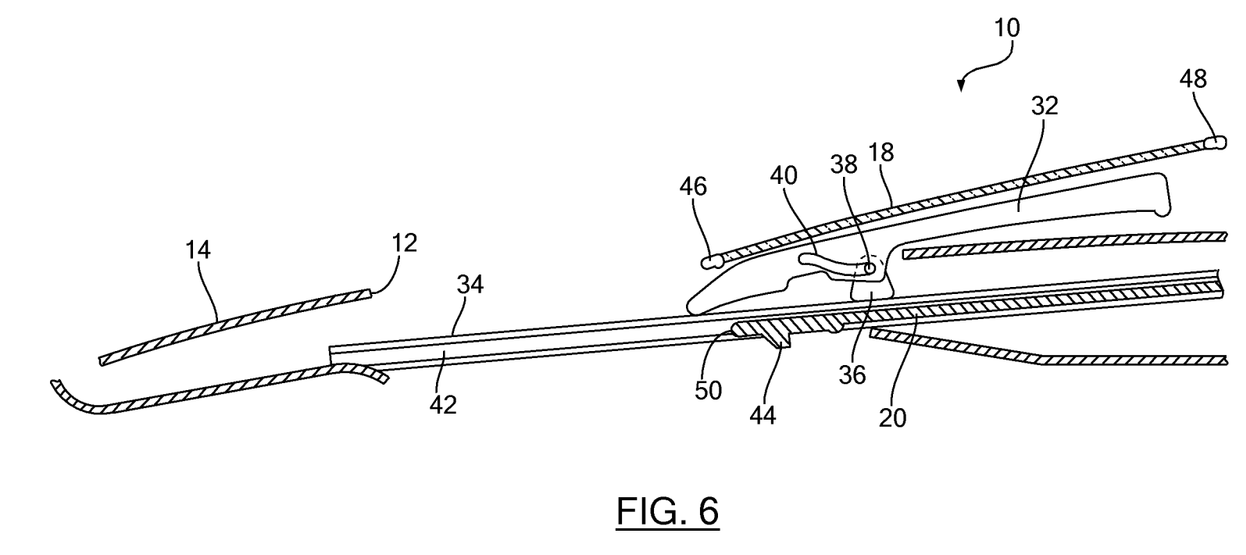
FIG. 6 is a partial sectional view of the moonroof assembly of FIG. 4 with the panel in a fully open position and with the sunshade having been moved into a partially open position.

As depicted in FIGS. 4-6, the panel 18 of the moonroof assembly 10 is illustrated as moving from a fully closed position (as seen in FIG. 4) to a vent position (as seen in FIG. 5) and subsequently to a fully open position (as seen in FIG. 6). Also depicted in FIGS. 4-6, the sunshade 20 is moved from a fully closed position (as seen in FIG. 4) to a fully open position (as seen in FIG. 5) and then to a partially open position (as seen in FIG. 6). Movement between these positions is effectuated by the transport arms 32, in cooperation with the various features illustrated in FIG. 3 and other features.

As the motor 24 drives the gear 30, the flexible cables 22 are caused to move along the side of the opening 12 of the moonroof assembly 10, in either a forward or rearward direction, depending on the direction of rotation of gear 30. The ends of the cables 22 are connected to a guide block 36 that is slideably engaged for movement along the length of the support rail 34. As illustrated in FIGS. 4-6, the support rail 34 is partially shown and has the guide block 36 and the transport arms 32 positioned thereon. In actual practice, and a person skilled in the art will appreciate, portions of the guide block 36 and transport arms 32 are captive and slide within channels of the support rail 34. For clarity and ease of understanding, the support rail 34 is simply shown in the figures with the guide block 36 and transport arms 32 engaged thereon.

As noted above, a portion of the guide block 36 is engaged with the support rail 34. With respect to the transport arms 32, the forward ends of the transport arms 32 are engaged with the support rail 34 while the reward ends are freely movable and not engaged with the support rail 34.

Upon rearward movement of the flexible cables 22, the guide block 36, which is connected thereto, is caused to move rearward. An upper portion of the guide block 36 includes a feature, such as a pin 38, that interacts with a portion, such as a slot 40, of the transport arms 32. The slot 40 is shaped so as to slope downward as one progresses from the forward end of the slot 40 toward the rearward end of the slot 40. As a result of this slope, and more particularly the interaction of the pin 38 with the slot 40, the transport arms 32 are caused to pivot about their forward ends and their rearward ends are lifted upward and the guide block 36 is move rearward by the cables 22. As seen in FIG. 5, once the pin 38 has moved to the rearward end of the slot 40, the lifting of the rearward end of the transport arms 32 causes the rearward edge of the panel 18 to be lifted out of the opening 12 into the vent position.

In the closed position of the panel 18 seen in FIG. 4, the sunshade 20 may also be in a fully closed position. However, when the sunshade 20 is in the vent position, the occupant of the vehicle will want the sunshade 20 in an open position so as to take advantage of the benefits of the panel 18 in the vent position. The sunshade 20 may be manually moved to its fully open position (seen in FIG. 5) or, alternatively, movement of the sunshade 20 may be automated.

In the illustrated embodiment, the sunshade 20 is supported by the support rail 34 such that the lateral sides of the sunshade 20 slideably ride within a channel 42 defined by the support rail 34. To open the sunshade 20, an occupant of the vehicle 16 grasps a handle 44, provided adjacent the forward end 46 of the sunshade 20, and slides the sunshade 20 rearward until it stops in its fully open position. Preferably, a stopper is provided within the channel 42 to limit movement of the sunshade 20. With the sunshade 20 in this fully open position, the maximum amount of visible area through the moonroof assembly 10 is presented to the occupant of the vehicle.

If the control circuit 26 continues to operate the motor 24 and drives the gear 30 to further retract the flexible cables 22, the panel 18 of the moonroof assembly 10 will be moved into its fully open position. As such, the panel 18, transport arms 32 and the guide block 36 maintain their relative positions seen in FIG. 5. However, the guide block 36 and the transport arms 32 are further slid rearward along the support rail 34. This in turn moves the panel 18 so that its forward or leading edge 46 separates from the forward edge defining the opening 12, thereby providing an unobstructed opening of the moonroof assembly 10, as seen in FIG. 6. The rearward edge 48 of the panel 18, as seen in FIG. 6, is positioned such that it extends exteriorly of the opening 12 and over the rear portion of the roof 14. Along with the panel 18, the rearward portion of the transport arms 32 also extends exteriorly of the opening 12 and over the rear portion of the roof 14.

Notably, and as also seen in FIG. 6, the sunshade 20 has been moved forward from its fully open position in FIG. 5. The sunshade 20 is now located in a partially closed position. The precise orientation of the forward edge 50 of the sunshade 20 relative to the forward edge 46 of the panel 18 is not intended to be depicted in FIG. 6. That precise orientation will vary depending on the specific design of the vehicle within which the present invention is incorporated and the specifically intended results of the positioning. For instance, the precise positioning of the forward edge 50 of the sunshade 20 relative to the forward edge 46 of the panel 18 may be utilized in certain vehicles to mitigate the effects of wind throb. Alternatively, the forward edge 50 of the sunshade 20 may be utilized to conceal the actuation mechanisms associated with the manipulation and movement of the panel 18. In either scenario, the forward edge 50 of the sunshade 20 may be forward of, vertically aligned with, or rearward of the forward edge 46 of the panel 18. In all scenarios, however, the forward edge 50 of the sunshade 20 is positioned farther forward relative the vehicle than that in the fully open position of the sunshade 20.

Various mechanisms can be envisioned for automatically moving the sunshade 20 out of its fully open position when the panel 18 is being moved into its fully open position. Several representative mechanisms for achieving this result are presented in FIGS. 7a-7c.

Figure 7A:
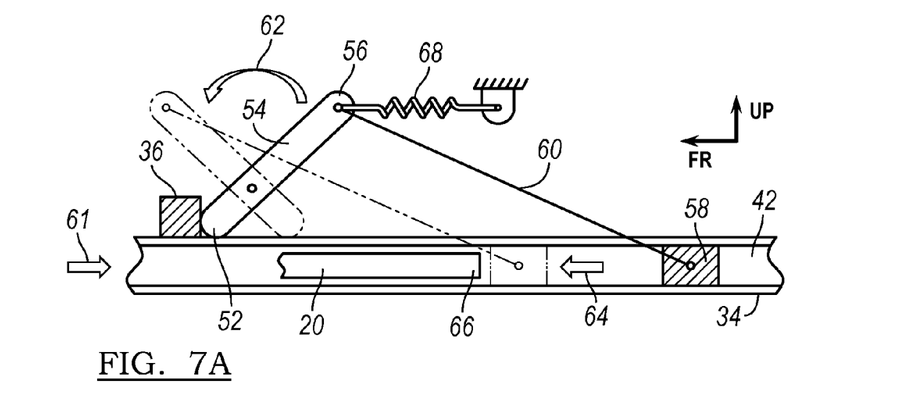
FIGS. 7a, 7b and 7c are schematic illustrations of mechanisms for moving the sunshade from the fully open position of FIG. 5 to the partially open position of FIG. 6 in accordance with the principles of the present invention.

Referring now to FIG. 7a, the sunshade 20 is seen and partially illustrated within the channel 42 of the support rail 34. With this mechanism, as the guide block 36 is moved toward its rearmost position, the guide block 36 engages the engagement end 52 of a lever 54. The lever 54 is pivotably supported, between its opposing ends, on a pin that is engaged with either another portion of the moonroof assembly 10, such as the support rail 34, or another portion of the vehicle 16. The opposing end 56 of the lever 54, hereafter referred to as the acting end 56, is coupled to a stopper 58 received within the channel 42 of the support rail 34. The stopper 58 may be the previously mentioned stopper that limits the rearward extent of travel of the sunshade 20 into its fully open position. The acting end 56 of the lever 54 can be coupled to the stopper 58 by various actuation members, including a rod 60, a wire or other generally rigid linkage member.

In operation of the mechanism of FIG. 7a, as the guide block 36 engages the engagement end 52 of the lever 54, the lever 54 is caused to pivot about the pin 55. This action causes the acting end 56 of the lever 54 to move in the direction of the arrow 62, into the position shown in phantom. As the acting end 56 is moved into this position, the rod 60 pulls forward on the stopper 58 causing the stopper 58 to move forward in the direction of arrow 64. This movement of the stopper 58 in turn causes the stopper 58 to engage and push on the rearward end 66 of the sunshade 20. The lever 54 and its connection to the stopper 58 are dimensioned such that the stopper 58 moves the sunshade 20 from the fully open position to the desired partially opened position that is generally represented in FIG. 6. Accordingly, when the panel 18 of the moonroof assembly 10 is opened to its fully open position, the sunshade 20 is automatically moved into the desired partially open position.

When the block 36 disengages from the engagement and 52 of the lever 54, a biasing or return member, such as a spring 68, causes the lever 54 to return to its original position. This movement of the lever 54 to its original position also has the effect of causing the stopper 58 to move to its original position. If the spring 68 is not provided, the lever 54 and stopper 58 will remain in their forward position until the sunshade 20 is next moved into its fully open or rearward most position. As the sunshade 20 is moved into its fully open position, the rearward and 66 of the sunshade 20 engages the stopper 58 and causes the stopper to move in the direction opposite of arrow 64. When the stopper 58 and/or the lever 54 reaches the full extent of its range of motion, the stopper 58 will prevent further rearward movement of the sunshade 20. Optionally, the stopper 58 can be used in connection with other mechanisms to limit movement of the sunshade 20 to the fully open position.

Figure 7B:
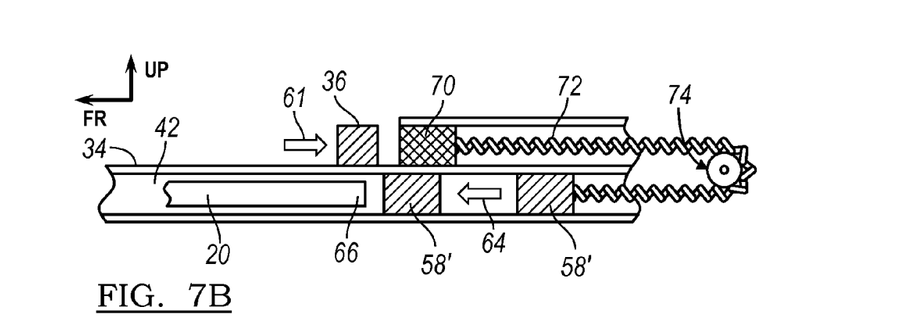

Referring now to FIG. 7b, an additional embodiment for automatic movement of the sunshade 20 from the fully open position to the partially open position during full opening of the panel 18 of the moonroof assembly 10 is shown therein. In this embodiment, the guide block 36 engages an end fitting 70 of a semi-rigid drive cable or wire 72. In this embodiment, the actuation member, the drive cable 72, extends rearward about a wheel or pulley 74 wherein it reverses its direction and subsequently terminates in stopper 58'. In this illustrated embodiment the drive cable 72 is optionally retained within portions of the support rail 34, with the stopper 58' being located within the channel 42 and also receives the sunshade 20.

During operation of the embodiment of FIG. 7b, as the guide block 36 moves rearward in the direction of arrow 61, the guide block 36 engages and rearwardly pushes on the end fitting 70. This rearward movement loads the drive cable 72 in compression and, as a result of the reversal direction by the pulley 74, causes the drive cable 72 to push the stopper 58' in the forward direction of arrow 64. Similar to the prior embodiment, the stopper 58' engages the rearward end 66 of the sunshade 20 and moves the sunshade 20 out of its fully open position to the desired partially open position.

Figure 7C:
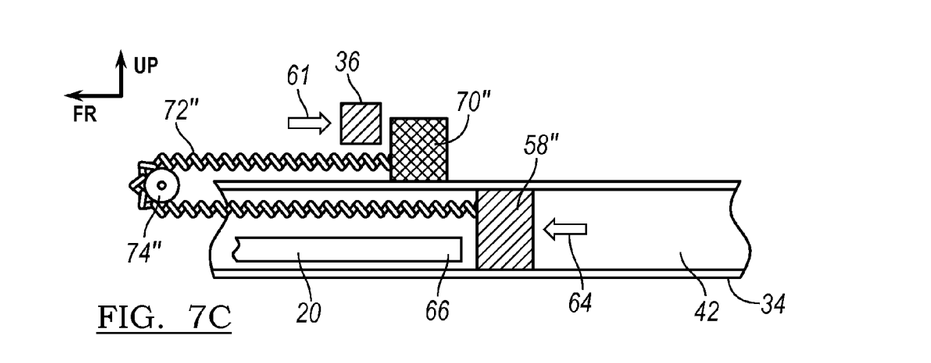

A third embodiment for the automatic movement of the sunshade 20 from the fully open position to the desired partially open position, during full opening of the panel 18 of the moonroof assembly 10, is shown in FIG. 7c. This embodiment is similar to the embodiment of FIG. 7b in that it utilizes a semi-rigid drive cable 72" having an end fitting 70" and the stopper 58". This third embodiment differs from the immediately preceding embodiment and that the drive cable 72" is configured so as to be loaded in tension as opposed to compression. To achieve this, the drive cable 72" extends in the forward direction from the end fitting 70". The drive cable 72" then reverses its direction around a wheel/pulley 74" before extending in the rearward direction and terminating at the stopper 58". Thus, when the guide block 36 engages the end fitting 70", it causes rearward movement of the end fitting 70", but this rearward movement causes the drive cable 72" to pull the stopper 58" in the forward direction causing movement of the sunshade 20 out of its fully open position and into the desired partially open position.

Like the first embodiment of FIG. 7a, the second and third embodiments can optionally include a return member to bias the end fittings, drive cables and stoppers back into their original positions that are associated with the fully open position of the sunshade 20.

With the various embodiments incorporating the principles of the present invention, as the panel 18 of the moonroof assembly 10 is moved into its fully open position, the sunshade 20, if it is in its fully open position, is automatically moved to a partially closed position where the sunshade 20 can be utilized to aesthetically enhance the appearance of the moonroof assembly 10 and/or mitigate wind throb occurring as a result of the vehicle 16 being driven with the moonroof assembly 10 in its fully open position.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

I claim:

1. A moonroof assembly for an automotive vehicle, the moonroof assembly comprising:
   a transparent panel moveable between a closed position and a fully open position relative to an opening in a vehicle roof;
   an actuation motor being coupled to the panel and being operative to move the panel between the closed position and the fully open position;
   a sunshade moveable between a closed position, a fully open position and a partially open position, the partially open position being a position located between the closed position and the fully open position; and
   a mechanism coupled between the panel and the sunshade, the mechanism effectuating automatic movement of the sunshade into the partially open position in response to movement of the panel into a fully open position, wherein the mechanism for automatically moving the sunshade into the partially open position moves the sunshade from the fully open position of the sunshade.

2. The moonroof assembly of claim 1, wherein the mechanism includes a moveable stopper, the stopper being positioned for engagement with the sunshade whereby the sunshade is moved into the partially open position during movement of the stopper.

3. The moonroof assembly of claim 2, wherein the stopper engages a rearward end of the sunshade.

4. The moonroof assembly of claim 2, wherein the stopper is mechanically coupled to a moveable drive member, the drive member is positioned to be moved by a portion of an opening mechanism coupled to the panel, whereby movement of the drive member causes movement of the stopper and sunshade in a direction toward the partially open position.

5. The moonroof assembly of claim 4, wherein the stopper is mechanically coupled to the drive member by one of a rigid or semi-rigid actuation member.

6. The moonroof assembly of claim 4, wherein the drive member is a lever.

7. The moonroof assembly of claim 4, wherein the drive member is an end fitting and the actuation member is a drive cable.

8. The moonroof assembly of claim 4, wherein the stopper and the drive member move in a common direction.

9. The moonroof assembly of claim 4, wherein the stopper and the drive member move in different directions.

10. The moonroof assembly of claim 4, wherein the drive member moves in one of a sliding or pivoting motion.

11. The moonroof assembly of claim 1, wherein when the sunshade is in the partially open position a forward end of the sunshade is generally adjacent to a forward end of the panel.

12. A method of moving a sunshade of a moonroof assembly in an automotive vehicle, the method comprising the steps of:

providing a moonroof assembly having a panel moveable between a closed position wherein an opening in a vehicle roof is closed and a fully open position wherein the opening in the vehicle roof is open, an actuation motor coupled to the panel and operative to move the panel between the closed position and the fully open position, and a sunshade moveable between a closed position, a fully open position and a partially open position, the partially open position being located between the closed position and the fully opened position of the sunshade;

moving the panel into the fully open position; and when the sunshade is in the fully open position, in response to the moving of the panel into the fully open position, automatically moving the sunshade into the partially open position.

13. The method of claim 12, wherein the partially open position is a wind buffeting position that at least partially mitigates wind throb in the vehicle.

14. The method of claim 12, wherein the partially open position is a position in which a forward end of the sunshade is generally adjacent to the forward end of the panel.

15. The method of claim 12, wherein the step of automatically moving the sunshade moves the sunshade to the partially open position from the fully open position.

16. The method of claim 12, wherein the step of automatically moving the sunshade loads an actuation member in compression.

17. The method of claim 12, wherein the step of automatically moving the sunshade loads an actuation member in tension, the actuation member being generally connected between the panel and the sunshade.

* * * * *